Feb. 22, 1966 W. H. WOOD 3,236,354
CONVEYOR BELT SUPPORT
Filed Dec. 27, 1963
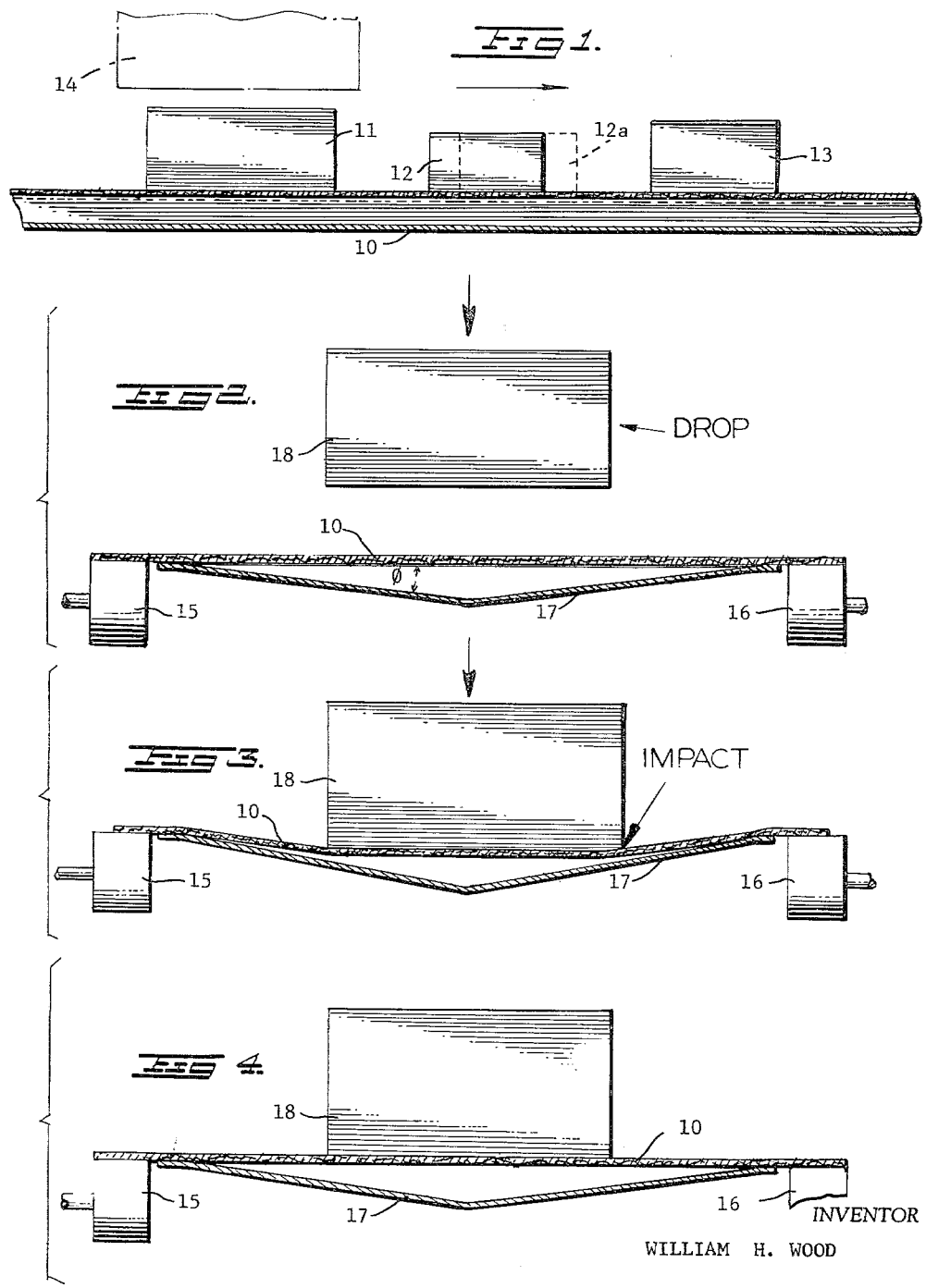
INVENTOR
WILLIAM H. WOOD
BY John B. Sponsler

United States Patent Office 3,236,354
Patented Feb. 22, 1966

3,236,354
CONVEYOR BELT SUPPORT
William H. Wood, Roanoke, Va., assignor to General
Electric Company, a corporation of New York
Filed Dec. 27, 1963, Ser. No. 333,987
1 Claim. (Cl. 198—1)

This invention relates to conveyor apparatus and more particularly to conveyor belts of the endless type whereon objects are loaded under specific control mechanisms for delivery from one location to another location.

In the prior art moving endless belts have been utilized for transporting objects from one location to another, loading the objects and unloading the objects manually either while the belts are moving slowly or by stopping the movement of the belt at loading and unloading times. As the speed of operation of these belts becomes increased and the efficiency of such apparatus is improved to load and unload at full speed, manual loading and unloading is no longer feasible; consequently, automatic or semi-automatic loading and unloading devices have been employed, usually involving mechanical handling mechanisms and electrical controls. The most successful of these high speed loading and unloading devices require careful synchronism with the movement of the conveyor belts since accurate positioning of the objects upon the belts is necessary in order to insure proper delivery.

In loading objects upon moving conveyor belts and the like, for example, the objects may be dropped onto the belt through a distance to clear the height of the highest object; consequently, since many of these objects may have considerable mass the consequent rebound of the object from the belt and its immediate support at the loading position gives rise to slippage and inaccurate loading. Furthermore even with objects of small mass slippage may occur between the object and the moving conveyor belt until the speed of the former reaches the speed of the latter.

It is an object, therefore, of this invention to provide a means in a conveyor belt loading apparatus for insuring minimum rebound and slippage of the object being loaded onto a moving conveyor belt.

Experiment and studies of conveyor belt loading apparatus and its performance have shown that rebound and slippage may be reduced by the provision of shock absorbing devices. Moreover, it has been also determined that the rebound and slippage may be more precisely controlled by providing shaped or angled belt supports at the loading locations, whereby the belt per se enters into the shock absorbing reaction.

It is, therefore, another object of this invention to provide a conveyor belt support for reducing rebound and slippage of an object forcibly deposited upon a conveyor belt by suitably shaping and disposing the support in respect to the belt.

In the present invention it has been discovered, for example, that if a V-shaped platform is used to support the conveyor belt at the loading location, thereby leaving a normally, non-supporting portion in the center of the belt, objects will adhere more readily to the belt surface when forcibly dropped thereupon. Less rebound and slippage results from a supporting structure of V-shape than from a horizontal platform type of belt support.

It is, therefore, a further object of this invention to provide a conveyor belt supporting member having substantially a V-shape transverse of the belt.

It appears also that with a V-shaped support for a conveyor belt the optimum angle which the support makes with the horizontal plane of the belt is within a range of from 2 to 9 degrees, for example, when using a canvas belt 28 inches wide and depositing objects upon the belt from a height of free-fall of 36 inches upon a belt moving at a rate between 300 and 360 feet per minute. Under operating conditions a V-shaped belt appears to assume the shape of a catenary under impact of an object being loaded. Considering a cross section of the belt it also appears that at the ends (sides of the belt) there is a maximum rebound having a functional relationship with the resiliency of the belt, the object and the support, that in the center there is a maximum rebound having a functional relationship with the resiliency of the belt only, and that at points between the ends and the center there is a minimum rebound having a functional relationship with the first two mentioned relationships.

Still another object of the invention, therefore is to provide a conveyor belt support, which, together with the belt affords maximum resiliency rebound at the sides and center of the belt and minimum resiliency rebound at points therebetween.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 1 is a schematic view of a conveyor belt upon which objects have been deposited subject to rebound and slippage.

FIGURE 2 is a cross-sectional view of a conveyor belt having a shaped supporting member thereunder.

FIGURE 3 is a view similar to FIGURE 2 illustrating the impact and rebound of an object forcibly loaded thereonto.

FIGURE 4 is a view similar to FIGURES 2 and 3 illustrating the object at rest upon the left after rebounding as illustrated in FIGURE 3.

Referring now to FIGURE 1 a belt 10 moves under a loader 14 which successively deposits objects 11, 12 and 13 upon the belt, delivery mechanism (not shown) being activated simultaneously with each object deposited to provide the necessary destination unloading as illustrated in copending application Serial No. 188,175, filed April 17, 1962, now U.S. Patent No. 3,181,713.

Since the destination coding for each object must be precisely coordinated with the placing of objects upon the moving conveyor belt, any material deviation of the object's position upon the belt, such as occurs when the object bounces or rebounds, or when slippage occurs between the objects and the belt, may result in erroneous delivery of the object at destination. For exampe, the leading edges of objects 11, 12 and 13 normally are coordinated with the destination coding initial pulses so that if slippage or rebound tends to displace any of these objects from the coordinated coding position upon the belt, erroneous operation may result. In FIGURE 1, as shown, the intervals between the leading edges of objects 11 and 12 and between objects 12 and 13 being used as a measure of coding reference, it is to be noted that if all three objects were loaded onto the belt 10 properly at equally spaced intervals, the aforesaid intervals would be equal. However, as shown in FIGURE 1 the object 12 has become displaced through slippage or rebound so that its proper position on the belt 10 should be according to the dotted lines as indicated by 12a. A substantial deviation of this kind results in erroneous delivery at destination and, in some instances, may also cause the unloading station to become jammed.

FIGURE 2 represents the manner, as envisioned by the present invention, in which rebound and slippage has been overcome to avoid the erroneous operation discussed above. The belt 10 is shown in cross section with an object 18 being deposited via gravity onto its surface, the belt 10 being supported between rollers 15 and 16 and superimposed over a V-shaped member 17 at the loading station. Normally the V-shaped member should extend, lengthwise of the belt, an amount greater than the greatest dimension of an object to be deposited. The support 17 makes an angle with the horizontal plane of the belt 10, this angle always being more than 0 degrees and less than 45 degrees, depending to some extent upon the width and resiliency of the belt, the impact dimensions of the object, and the impact energy. Referring to FIGURE 3, however, it is to be noted that at impact each portion of the belt between the roller supports and the boundaries of the impacting object assumes a relationship, somewhat resembling a catenary, whereby the belt is deformed from its edges to bear progressivey upon the V-shaped support in a direction toward the center of the belt. This deformation of the belt and consequent bearing upon the V-shaped support not only reduces the rebound tendencies of the object in respect to the belt, but also tends to dampen the motion of the belt and the object under impact until a stable condition is reached as shown in FIGURE 4. Consequently, the angle should be of such value that under impact of an object being deposited (1) deformation of the belt is gradually taken up by the outer portions of the support 17 and (2) the center portion of the belt does not impinge upon the support.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claim to cover all such modifications as fall within the scope and spirit of the invention.

What is claimed is:

In a conveyor apparatus wherein objects are loaded and unloaded automatically according to destination coding coordinated with forcibly depositing an object upon said apparatus at a loading station, a moving belt onto which objects are loaded, a pair of rotatable, fixed edge supports for said belt at said loading station, and a V-shaped impact member underneath and extending transversely of said belt, the said member making an angle with the horizontal at each edge of the belt more than 0 and less than 90 degrees and being ararnged so that under impact of an object loaded the belt does not impinge upon the bottom of the V-shaped member.

References Cited by the Examiner

UNITED STATES PATENTS 2,323,368   7/1943   Biedess _____ 198—204 X

EVON C. BLUNK, *Primary Examiner.*

WILLIAM B. LABORDE, SAMUEL F. COLEMAN,
*Examiners.*

R. E. AEGERTER, *Assistant Examiner.*